United States Patent
Yoon (10) Patent No.: US 11,033,364 B2
(45) Date of Patent: Jun. 15, 2021

(54) ORTHODONTIC BRACKET

(71) Applicant: BIOCETEC CO., LTD., Seoul (KR)

(72) Inventor: Sung Hee Yoon, Seoul (KR)

(73) Assignee: BIOCETEC CO., LTD., Seoul (KR)

( * ) Notice: Subject to any disclaimer, the term of this patent is extended or adjusted under 35 U.S.C. 154(b) by 0 days.

(21) Appl. No.: 17/094,014

(22) Filed: Nov. 10, 2020

(65) Prior Publication Data

US 2021/0137646 A1    May 13, 2021

(51) Int. Cl.
 *A61C 7/16*   (2006.01)

(52) U.S. Cl.
 CPC ..................... *A61C 7/16* (2013.01)

(58) Field of Classification Search
 CPC ........... A61C 7/14; A61C 7/141; A61C 7/143; A61C 7/145; A61C 7/146; A61C 7/148; A61C 7/16; A61C 7/18
 USPC ....................................................... 433/8, 9
 See application file for complete search history.

(56) References Cited

U.S. PATENT DOCUMENTS

| | | | |
|---|---|---|---|
| 4,842,513 A * | 6/1989 | Haarmann ............... | A61C 7/12 433/9 |
| 6,910,884 B2 | 6/2005 | Kelly et al. | |
| 2004/0121278 A1 | 6/2004 | Kelly et al. | |
| 2004/0121279 A1* | 6/2004 | Kelly ..................... | A61C 7/146 433/9 |
| 2006/0166159 A1* | 7/2006 | Abels .................. | B23K 26/361 433/8 |
| 2008/0113311 A1* | 5/2008 | Forster ................... | A61C 7/287 433/11 |
| 2011/0033812 A1* | 2/2011 | Swain .................... | A61C 7/143 433/10 |
| 2011/0086323 A1* | 4/2011 | Wessinger ............... | A61C 7/14 433/11 |
| 2013/0236847 A1* | 9/2013 | Shin ........................ | A61C 7/30 433/3 |

(Continued)

FOREIGN PATENT DOCUMENTS

| JP | H09154854 A | 6/1997 |
|---|---|---|
| JP | 3408683 B2 | 5/2003 |

(Continued)

OTHER PUBLICATIONS

Korean Intellectual Property Office, Notification of Reason for Refusal, Application 10-2019-0143994, Orthodontic Bracket, English Translation, dated Dec. 2, 2019, 4 pages.

(Continued)

*Primary Examiner* — Jacqueline T Johanas
*Assistant Examiner* — Thomas Drew Agger
(74) *Attorney, Agent, or Firm* — Faegre Drinker Biddle & Reath LLP (57) ABSTRACT

The present invention relates to an orthodontic bracket that is capable of coping with stress applied in various directions in oral environments to stably treat malocclusion. According to the present invention, the orthodontic bracket includes: a base having a bonding reference surface coming into contact with a tooth and a plurality of unit engraved patterns slant inward to given depths from the bonding reference surface to allow a bonding agent for bonding the tooth thereto to be accommodated therein; and a body provided on top of the base and having a slot adapted to insert a wire thereinto.

13 Claims, 8 Drawing Sheets

(56) References Cited

U.S. PATENT DOCUMENTS

2015/0182307 A1* 7/2015 Yick .................. A61C 7/125
433/9

FOREIGN PATENT DOCUMENTS

| KR | 10-1281268 B1 | 7/2013 | | |
|---|---|---|---|---|
| KR | 10-20140142896 A | 12/2014 | | |
| KR | 20140142896 A | 12/2014 | | |
| KR | 20150031948 A | 3/2015 | | |
| KR | 10-2015-0120914 A | 10/2015 | | |
| KR | 20150120914 A | 10/2015 | | |
| KR | 20180107469 A | 10/2018 | | |
| WO | WO-9416639 A1 * | 8/1994 | ............... | A61C 7/18 |

OTHER PUBLICATIONS

Korean Search Report, PCT/KR2020/014352, dated Oct. 20, 2020, 4 pages.

* cited by examiner

FIG. 14

ORTHODONTIC BRACKET

CROSS REFERENCE TO RELATED APPLICATION OF THE INVENTION

The present application claims the benefit of Korean Patent Application No. 10-2019-0143394 filed in the Korean Intellectual Property Office on Nov. 11, 2019, the entire contents of which are incorporated herein by reference.

BACKGROUND OF THE INVENTION

Field of the Invention

The present invention relates to an orthodontic bracket used for a patient's orthodontic treatment, and more particularly, to an orthodontic bracket that is capable of coping with stress applied in various directions in oral environments to stably treat malocclusion.

Background of the Related Art

Orthodontic braces are used to treat a patient with improper positioning of teeth through orthodontic brackets. Generally, orthodontic treatment includes treatment for correcting irregular positioning of teeth or treatment for correcting relations between teeth and surrounding anatomical structures. The irregular positioning of teeth may include malocclusion with different degrees of seriousness.

Figure 1A:
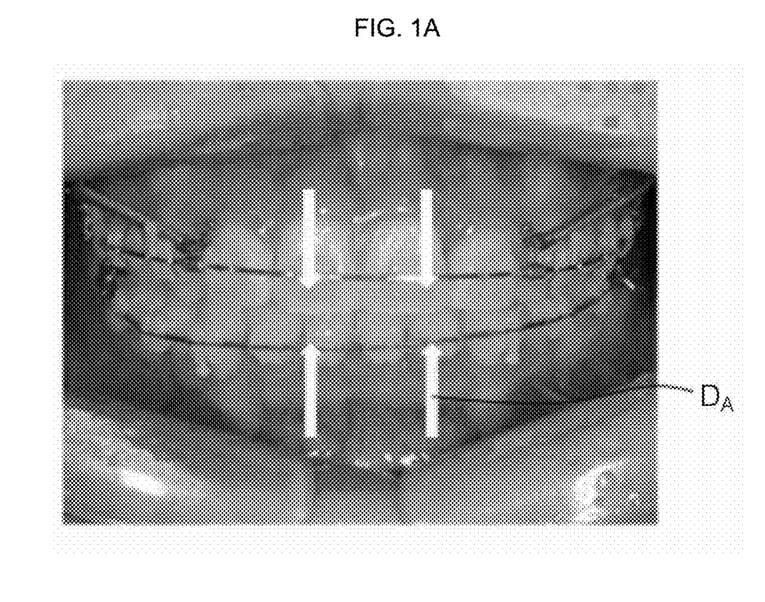
FIGS. 1A and 1B are photographs showing teeth with conventional orthodontic brackets attached thereto.
Figure 1B:
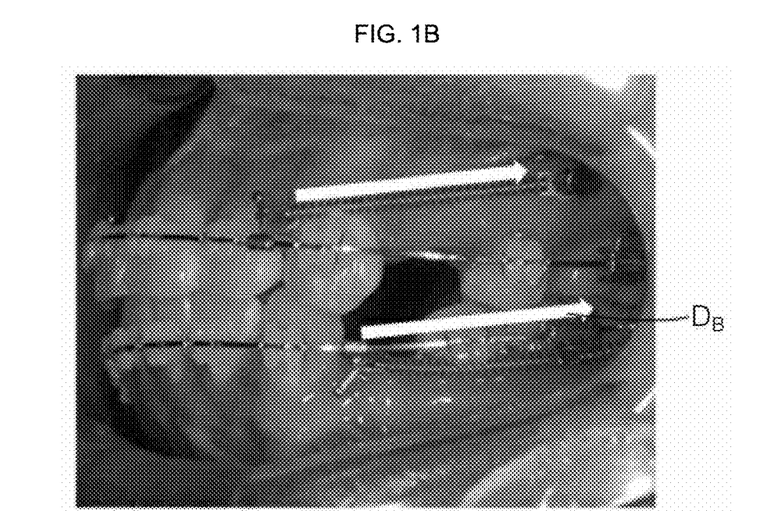

FIGS. 1A and 1B are photographs showing teeth with conventional orthodontic brackets attached thereto.

As shown in FIGS. 1A and 1B, forces applied in occlusal directions $D_A$ of antagonist teeth or in tension directions $D_B$ of orthodontic implants or coil spring forces are applied to the orthodontic brackets in the oral cavity. Even though not shown, further, rotating forces of arch wires are additionally applied to the orthodontic brackets.

If the orthodontic brackets are attached to the surfaces of teeth at low bonding strength, they may be detached therefrom due to the forces applied in various directions. This has a bad influence on the orthodontic braces so that the orthodontic treatment is not effectively carried out. Contrarily, if the orthodontic brackets are attached to the surfaces of teeth at stronger bonding strength than that needed, they may cause teeth damages due to masticatory forces during the orthodontic treatment and also may make the surfaces of teeth surface damaged when removed after the orthodontic treatment.

When the orthodontic brackets are attached to the surfaces of teeth, further, there is a method for chemically or mechanically increasing coupling strength between the orthodontic brackets and a bonding agent.

As the method for chemically increasing the coupling strength, an organic silane or silica $SiO_2$ is generally coated on a bonding base surface. However, the method makes the bonding strength excessively increased to undesirably cause tooth fracture or damages of enamel layers during or after the orthodontic treatment.

As the method for mechanically increasing the coupling strength, on the other hand, a bonding base is patterned to an undercut structure that is hard to mechanically escape from a bonding agent (resin). This method obtains the bonding strength in the range of bonding strength the resin has, thereby being more effective in ensuring the stability of a patient's orthodontic treatment. However, the conventional method for mechanically increasing the coupling strength fails to cope with stress applied in various directions in oral environments, so that during the orthodontic treatment, the orthodontic brackets may be detached from the surfaces of teeth.

SUMMARY OF THE INVENTION

Accordingly, the present invention has been made in view of the above-mentioned problems occurring in the related art, and it is an object of the present invention to provide an orthodontic bracket that is capable of coping with stress applied in various directions in oral environments.

To accomplish the above-mentioned object, according to the present invention, there is provided an orthodontic bracket including: a base having a bonding reference surface coming into contact with a tooth and a plurality of unit engraved patterns slant inward to given depths from the bonding reference surface to allow a bonding agent for bonding the tooth thereto to be accommodated therein; and a body provided on top of the base and having a slot adapted to insert a wire thereinto, wherein the base comprises first to fourth slant surfaces with inner walls formed in a depth direction thereof, the first slant surface and the second slant surface being spaced apart from each other by a given distance in such a manner as to face each other, the third slant surface being located between one side of the first slant surface and one side of the second slant surface, and the fourth slant surface being located between the other side of the first slant surface and the other side of the second slant surface, while being spaced apart from the third slant surface in such a manner as to face the third slant surface.

According to the present invention, desirably, when the base is bonded to the tooth, the first slant surface and the second slant surface are arranged in a direction of traction stress of the body through the wire or in an opposite direction to the direction of the traction stress, while being inward slant in the direction of the traction stress or in the opposite direction to the direction of the traction stress.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Hereinafter, the present invention is disclosed in detail with reference to the attached drawings.

Figure 2:
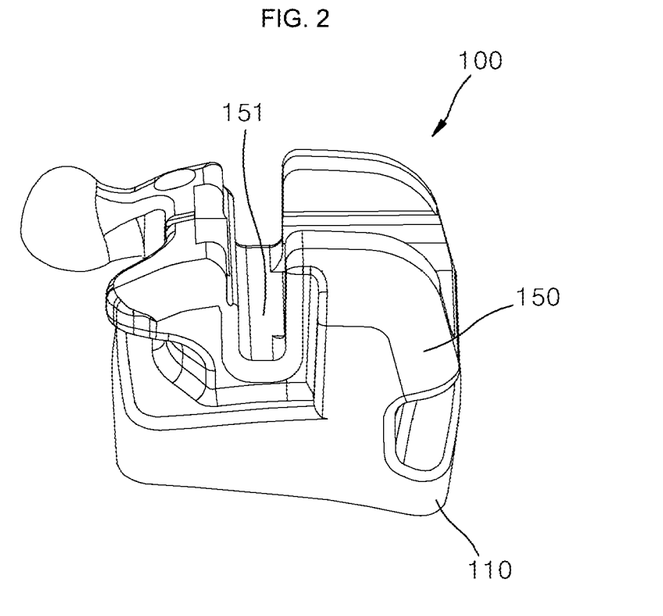
FIGS. 2 and 3 are perspective views showing an orthodontic bracket according to a first embodiment of the present invention, which are viewed in different directions.
Figure 3:
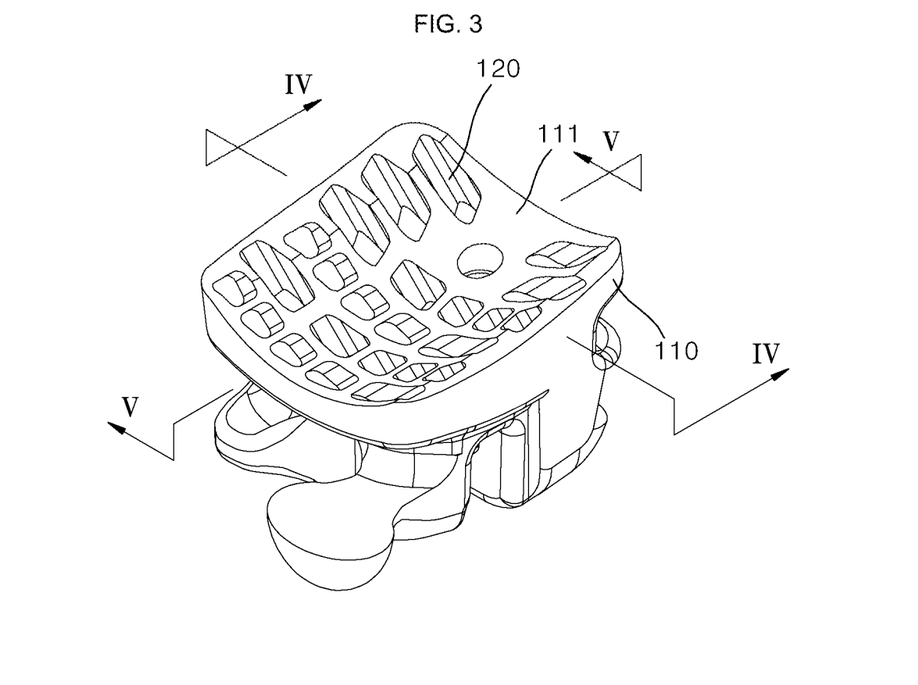

FIGS. 2 and 3 are perspective views showing an orthodontic bracket according to a first embodiment of the present invention, which are viewed in different directions.

As shown in FIGS. 2 and 3, an orthodontic bracket 100 according to a first embodiment of the present invention includes a base 110 having a bonding reference surface 111 coming into contact with a tooth (not shown) and a body 150. For orthodontic treatment, the base 110 is attached to the tooth by means of a bonding agent. The body 150 is provided on top of the base 110 and has a slot 151 adapted to insert an orthodontic wire thereinto. In this case, the base 110 and the body 150 are made of a single material in such a manner as to be formed unitarily with each other.

The base 110 accommodates the bonding agent therein and includes a plurality of unit engraved patterns 120 slant inward to given depths from the bonding reference surface 111.

Figure 4:
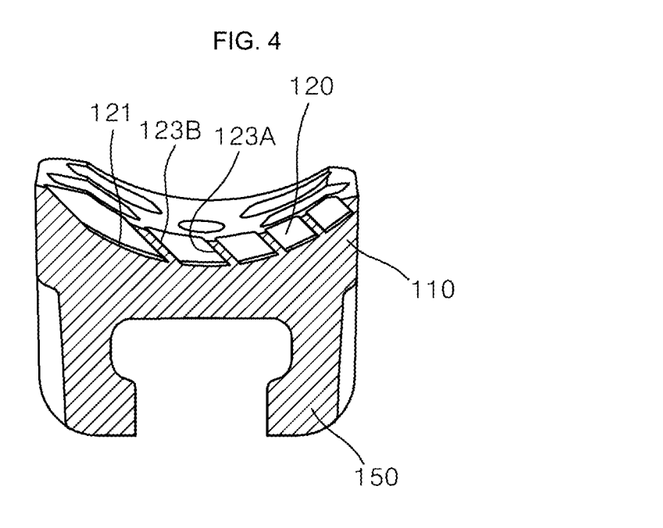
FIG. 4 is a sectional view taken along the line IV-IV of FIG. 3.
Figure 5:
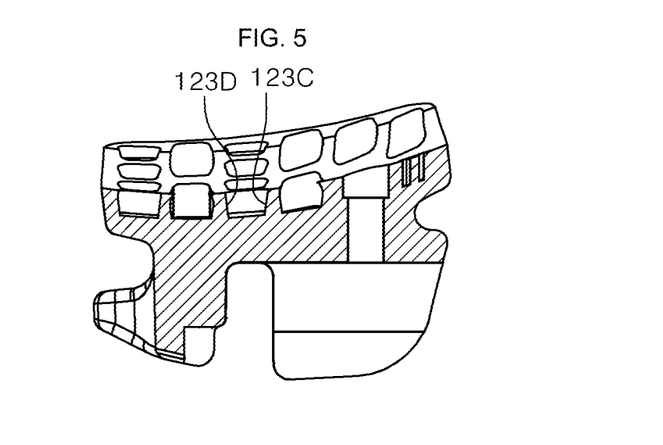
FIG. 5 is a sectional view taken along the line V-V of FIG. 3.

FIG. 4 is a sectional view taken along the line IV-IV of FIG. 3, and FIG. 5 is a sectional view taken along the line V-V of FIG. 3.

As shown in FIGS. 4 and 5, each unit engraved pattern 120 formed on the base 110 of the orthodontic bracket 100 has first to fourth slant surfaces 123A, 123B, 123C, and 123D with inner walls formed in a depth direction thereof. In this case, each unit engraved pattern 120 has an engraved pattern reference surface 121 formed on a bottom thereof in the depth direction thereof.

A capacity of the bonding agent accommodated into each unit engraved pattern 120 is dependent upon a depth of the engraved pattern reference surface 121 and a size of a space in the side walls by the first to fourth slant surfaces 123A, 123B, 123C, and 123D.

The first slant surface 123A and the second slant surface 123B are spaced apart from each other by a given distance in such a manner as to face each other. When the base 110 is attached to the tooth, in this case, the first slant surface 123A and the second slant surface 123B are arranged in a direction of traction stress of the body 150 through the wire or in an opposite direction to the traction stress direction.

The number of unit engraved patterns 120 each having the first slant surface 123A and the second slant surface 123B coping with a masticatory force or traction force and the depths of the unit engraved patterns 120 are adjusted to obtain stability with respect to the stress. In this case, the engraved pattern reference surface 121 is formed within a depth of 1 mm. If the slant surfaces of the unit engraved pattern 120 are inclined toward a direction coping with the traction direction of the tooth, like this, they have higher structural stability with respect to the traction force.

The second slant surface 123B is located in parallel to the first slant surface 123A. Otherwise, the second slant surface 123B is slant to a given inclination with respect to the first slant surface 123A so that a width between the first slant surface 123A and the second slant surface 123B becomes gradually narrow toward the engraved pattern reference surface 121.

Through the tapered slant surfaces, like this, an ejecting process of an injection molded body from a mold in an injection molding step can be easily performed when the orthodontic bracket 100 is manufactured, thereby improving productivity.

The third slant surface 123C is located between one side of the first slant surface 123A and one side of the second slant surface 123B. The fourth slant surface 123D is located between the other side of the first slant surface 123A and the other side of the second slant surface 123B, while being spaced apart from the third slant surface 123C in such a manner as to face the third slant surface 123C.

Figure 6:
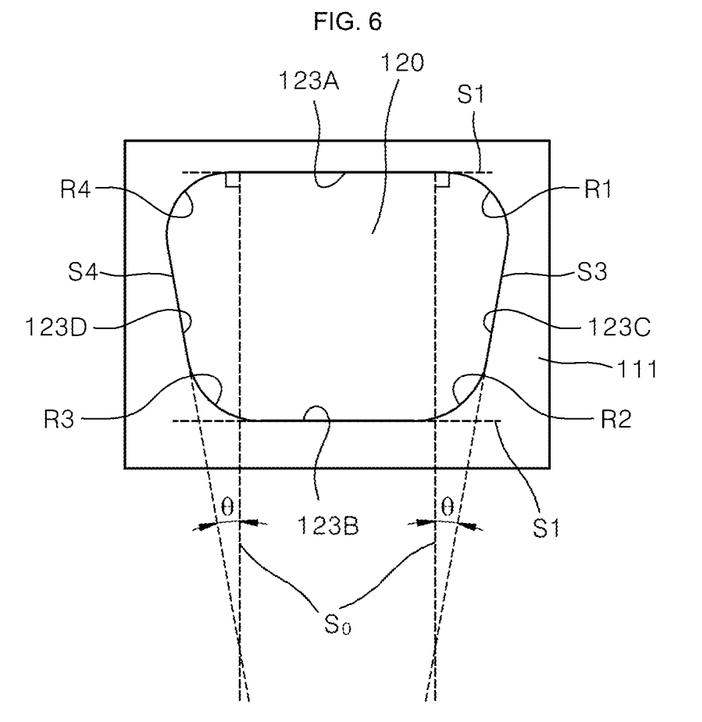
FIG. 6 is a front view showing a unit engraved pattern of the orthodontic bracket according to the first embodiment of the present invention.

FIG. 6 is a front view showing the unit engraved pattern of the orthodontic bracket according to the first embodiment of the present invention.

As shown in FIG. 6, neighboring corners R1, R2, R3, and R4 of the first to fourth slant surfaces 123A, 123B, 123C, and 123D are rounded to a given curvature r. Also, linear portions S3 and S4 formed between the third and fourth slant surfaces 123C and 123D and the bonding reference surface 111 are slant to a given inclination angle θ with respect to line segments S0 vertical with respect to linear portions S1 and S2 formed between the first and second slant surfaces 123A and 123B and the bonding reference surface 111.

In FIG. 6, both of the linear portions S3 and S4 have the given inclination with respect to the vertical line segments $S_0$, but of course, only one of them may be inclined, without being limited thereto.

In this case, the given inclination angle θ satisfies conditions of the following mathematical expression 1.

$$0° < θ < 45°$$ [Mathematical expression 1]

If the inclination angle is set like this, it may be adjusted to thus change an internal volume of the unit engraved pattern 120. Accordingly, an amount of the bonding agent accommodated in each unit graved pattern 120 can be controlled.

The given curvature r of the neighboring corners R1, R2, R3, and R4 of the first to fourth slant surfaces 123A, 123B, 123C, and 123D satisfies conditions of the following mathematical expression 2.

$$0.01 < r < 0.5 \text{ [mm]}$$ [Mathematical expression 2]

If the corners are set to satisfy the conditions of the mathematical expression 2, like this, an ejecting process of an injection molded body from a mold in an injection molding step can be easily performed when the orthodontic bracket 100 is manufactured, thereby improving productivity.

Further, as shown in FIG. 6, the fourth slant surface 123D is slant to a given inclination with respect to the third slant surface 123C so that a width between the third slant surface 123C and the fourth slant surface 123D becomes gradually narrow toward the inner sides thereof. As the inclination angle is set like this, the unit engraved pattern 120 has the front shape of a trapezoid.

Even though not shown, the third slant surface 123C and the fourth slant surface 123D may be arranged in parallel to each other to thus allow the unit engraved pattern 120 to have the front shape of a parallelogram.

The total number n of unit engraved patterns 120 of the orthodontic bracket 100 according to the present invention is greater than 10 and less than 40.

If the total number n of unit engraved patterns 120 is less than 10, portions where the bonding agent is accommodated are not uniformly distributed, thereby decreasing a bonding force. Contrarily, if the total number n of unit engraved patterns 120 is greater than 40, the unit graved patterns 120 are densely arranged on the limited area of the base 110, and accordingly, an inner wall of the base 110 supporting the neighboring unit engraved patterns 120 becomes reduced in thickness, thereby decreasing strength of the base 110.

Further, the number of unit engraved patterns 120 and the volume thereof can stratify conditions of the following mathematical expression 3.

$$\frac{\sum_{i=10}^{n} V_i}{n \cdot V_{min}} \leq 1.25 \quad \text{[Mathematical expression 3]}$$

In this case, n indicates the total number of unit engraved patterns 120, Vi the volume of i-th unit engraved pattern 120, and Vmin the volume of the unit engraved pattern having the smallest volume among the unit engraved patterns.

If the condition value is over 1.25 in the mathematical expression 3, deviations in fixing forces of the respective unit engraved patterns 120 may become high. Accordingly, the unit engraved patterns 120 have weak bonding forces with respect to specific directions.

Figure 7:
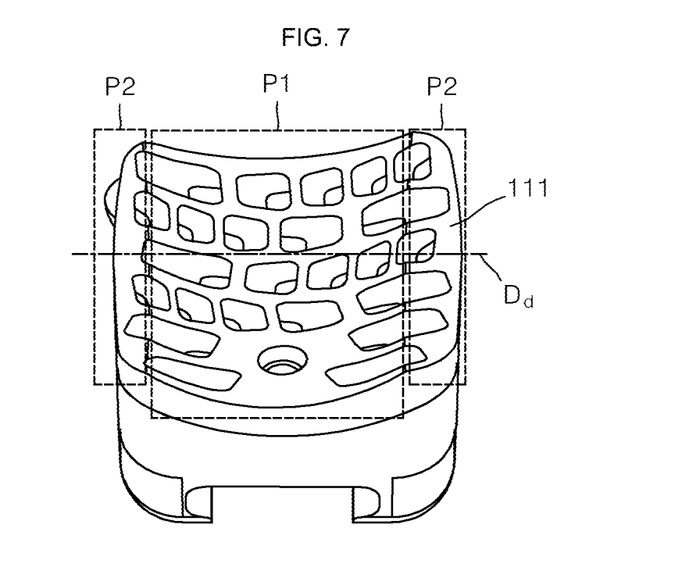
FIG. 7 is a perspective view showing bottom of a bonding reference surface of the orthodontic bracket according to the first embodiment of the present invention.

FIG. 7 is a perspective view showing bottom of the bonding reference surface of the orthodontic bracket according to the first embodiment of the present invention.

As shown in FIG. 7, the bonding reference surface 111 includes a plurality of bonding reference surfaces having different curved surfaces from one another in such a manner as to have different curvature radiuses from one another when the base 110 is cut in a tooth arrangement direction $D_d$. If the bonding reference surfaces having different curvature radiuses from one another are provided, like this, they can come into tighter contact with a patient's tooth surface whose curvature is not matched with the base 110. Accordingly, the bonding forces are improved, and the bonding agent can be effectively impregnated into the unit engraved patterns 120.

As shown in FIG. 7, the bonding reference surfaces include a first bonding reference surface P1 and second bonding reference surfaces P2 coming into contact with both ends of the first bonding reference surface P1.

The first bonding reference surface P1 comes into contact with a facial axis of the clinical crown (FACC) of the tooth when the base 110 is bonded to the tooth and has the smallest section curvature radius when compared with other bonding reference surfaces. In this case, the FACC means the most prominent portion of the central lobe on a two-division point (FA point) on a long axis of the clinical crown for all teeth except molars, and the FACC in the molars is the buccal vestibule separating two buccal cusps.

Further, the bonding reference surface can stratify the conditions of the following mathematical expression 4.

$$0.3 \leq \frac{A_1}{A_{all}} \leq 0.95 \quad \text{[Mathematical expression 4]}$$

In this case, $A_1$ indicates an area of the first bonding reference surface P1, and $A_{all}$ the entire area of the bonding reference surface.

If the condition value is less than 0.3 in the mathematical expression 4, the curved surface of the bonding reference surface becomes gentle to cause a low degree of contact with the tooth surface, so that a bonding force between the base 110 and the tooth surface may become weak. Contrarily, if the condition value is greater than 0.95, the bonding reference surface has a low degree of contact with a patient's tooth surface whose curvature is big, so that a bonding force between the base 110 and the tooth surface may become weak.

If the condition of the mathematical expression 5 is satisfied, on the other hand, a degree of contact between the base 110 and the patient's tooth surfaces with large and small curvatures can become high.

Figure 8:
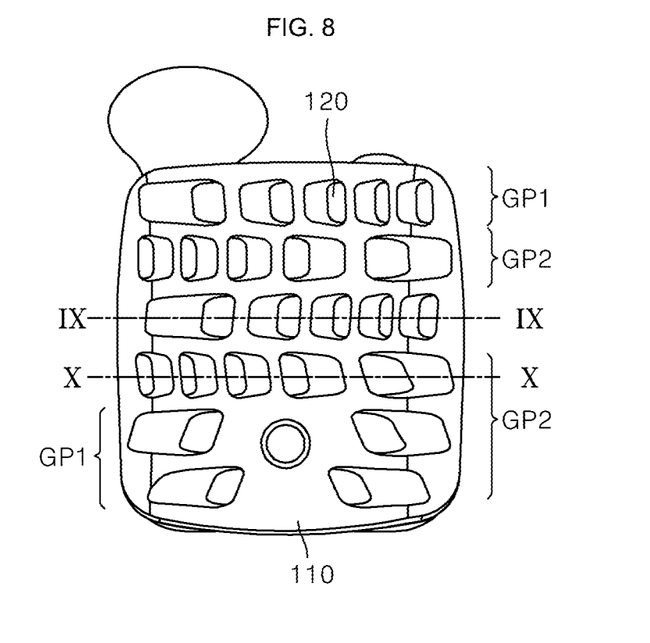
FIG. 8 is a bottom view showing the bonding reference surface of the orthodontic bracket according to the first embodiment of the present invention.
Figure 9:
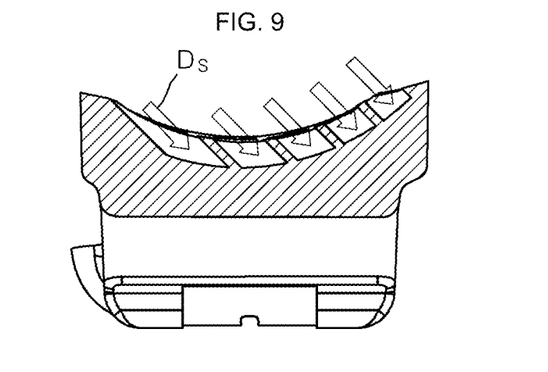
FIG. 9 is a sectional view taken along the line IX-IX of FIG. 8.
Figure 10:
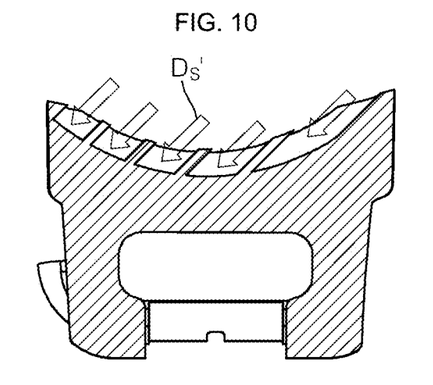
FIG. 10 is a sectional view taken along the line X-X of FIG. 8.
Figure 11:
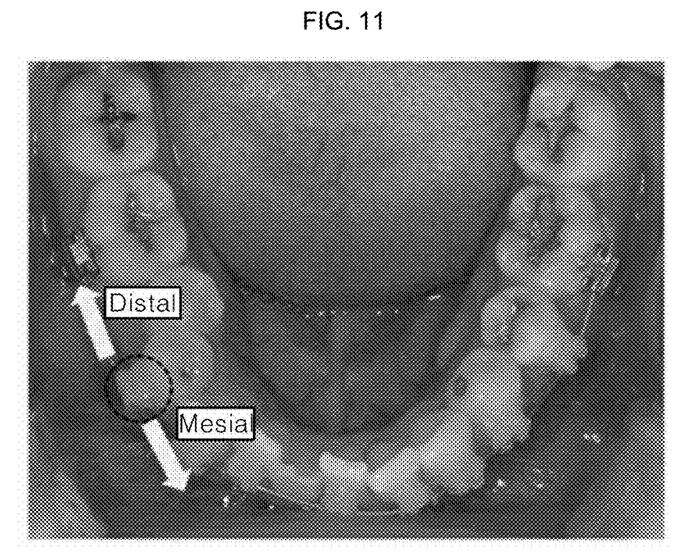
FIG. 11 is a photograph showing a state where the orthodontic bracket according to the first embodiment of the present invention is attached to a tooth.

FIG. 8 is a bottom view showing the bonding reference surface of the orthodontic bracket according to the first embodiment of the present invention, FIG. 9 is a sectional view taken along the line IX-IX of FIG. 8, and FIG. 10 is a sectional view taken along the line X-X of FIG. 8. Further, FIG. 11 is a photograph showing a state where the orthodontic bracket according to the first embodiment of the present invention is attached to a tooth.

Referring to FIGS. 8 to 11, groups of the unit engraved patterns formed in the same slanting directions Ds and Ds' as one another among the plurality of unit engraved patterns 120 are defined as engraved pattern groups. In this case, the base 110 has at least two or more engraved pattern groups GP1 and GP2. The plurality of unit engraved patterns 120 constituting each engraved pattern group are spaced apart from one another by a given distance in at least one row.

The engraved pattern groups include the first engraved pattern group GP1 and the second engraved pattern group GP2. When the base 110 is attached to the tooth, the first engraved pattern group GP1 has the inward slanting directions Ds of the plurality of unit engraved patterns 120 in a mesial direction of the tooth alignment. The second engraved pattern group GP2 has the inward slanting directions Ds' of the plurality of unit engraved patterns 120 in a distal direction of the tooth alignment.

In this case, the unit engraved patterns constituting the first engraved pattern group GP1 are arranged in at least two rows, and also, the unit engraved patterns constituting the second engraved pattern group GP2 are arranged in at least two rows. Further, each row of the unit engraved patterns constituting the first engraved pattern group GP1 and each row of the unit engraved patterns constituting the second engraved pattern group GP2 are arranged alternately with each other. Furthermore, as shown in FIG. 8, in some rows where the unit engraved patterns are formed, the unit engraved patterns constituting the first engraved pattern group GP1 are arranged alternately with the unit engraved patterns constituting the second engraved pattern group GP2.

Figure 12:
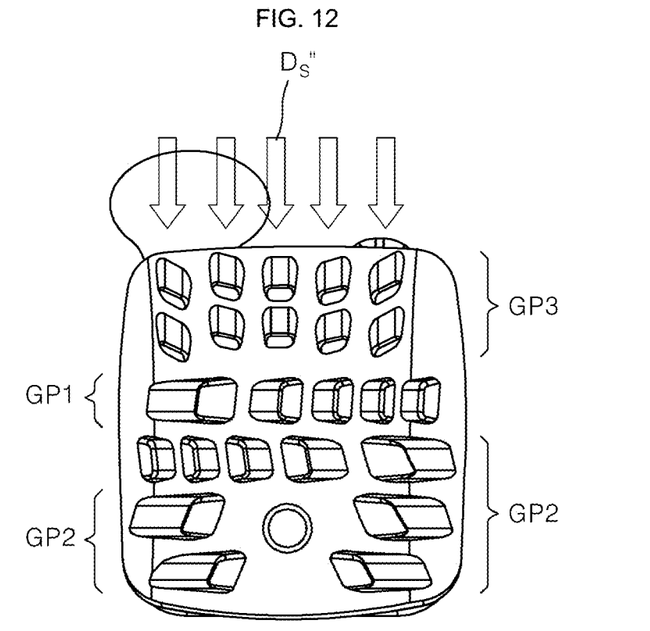
FIG. 12 is a bottom view showing a bonding reference surface of an orthodontic bracket according to a second embodiment of the present invention.
Figure 13:
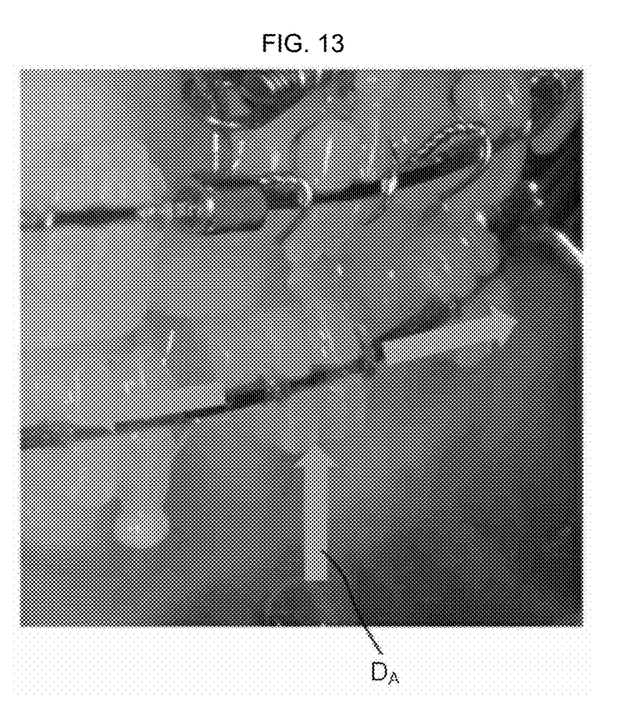
FIG. 13 is a photograph showing a state where an orthodontic bracket according to a third embodiment of the present invention is attached to a tooth.

FIG. 12 is a bottom view showing a bonding reference surface of an orthodontic bracket according to a second embodiment of the present invention, and FIG. 13 is a photograph showing a state where an orthodontic bracket according to a third embodiment of the present invention is attached to a tooth.

Referring to FIGS. 12 and 13, an orthodontic bracket according to a second embodiment of the present invention includes first to third engraved pattern groups GP1, GP2, and GP3. In this case, the inward slanting directions of the plurality of unit engraved patterns 120 constituting the first and second engraved pattern groups GP1 and GP2 are the same as of the plurality of unit engraved patterns 120 constituting the first and second engraved pattern groups GP1 and GP2 as shown in FIG. 10. On the other hand, the third engraved pattern group GP3 has the inward slanting directions Ds" of the plurality of unit engraved patterns 120 in perpendicular directions to the inward slanting directions of the plurality of unit engraved patterns 120 constituting the first and second engraved pattern groups GP1 and GP2.

In this case, the plurality of unit engraved patterns constituting the first and second engraved pattern groups GP1 and GP2 are arranged in total four rows. In the two rows among the four rows, the plurality of unit engraved patterns constituting the first and second engraved pattern groups GP1 and GP2 are arranged together, and in the remaining rows, the plurality of unit engraved patterns constituting the first and second engraved pattern groups GP1 and GP2 are arranged in one row, respectively. Further, the plurality of unit engraved patterns constituting the third engraved pattern group GP3 are arranged in two rows.

Under the above-mentioned configuration, the first and second engraved pattern groups GP1 and GP2 have high stability with respect to the stress applied in the mesial and distal directions, and the third engraved pattern group GP3 more stably copes with forces applied in the direction of the masticatory force or in the opposite direction $D_A$ to the direction of the masticatory force. According to the present invention, further, the orthodontic bracket can more stably cope with the tooth for treatment of deep overbite malocclusion.

Figure 14:
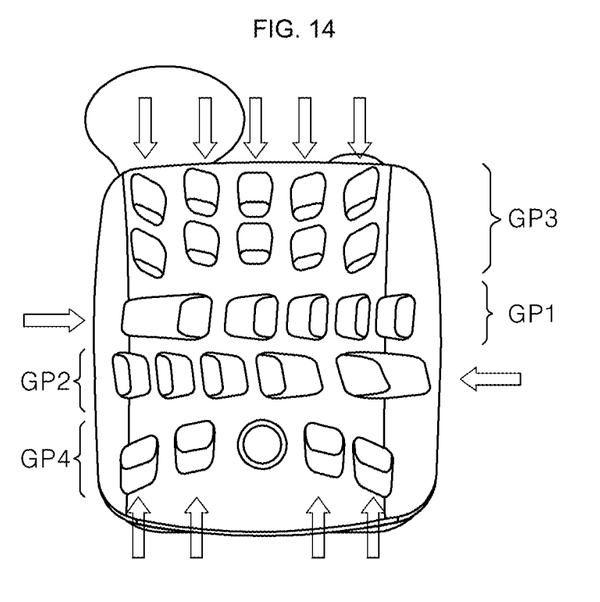
FIG. 14 is a bottom view showing a bonding reference surface of an orthodontic bracket according to a third embodiment of the present invention.

FIG. 14 is a bottom view showing a bonding reference surface of an orthodontic bracket according to a third embodiment of the present invention.

As shown in FIG. 14, an orthodontic bracket according to a third embodiment of the present invention includes first to fourth engraved pattern groups GP1, GP2, GP3, and GP4. In this case, the inward slanting directions of the plurality of unit engraved patterns 120 constituting the first to third engraved pattern groups GP1, GP2, and GP3 are the same as of the plurality of unit engraved patterns 120 constituting the first to third engraved pattern groups GP1, GP2, and GP3 as shown in FIGS. 10 to 13.

The fourth engraved pattern group GP4 has the inward slanting directions of the plurality of unit engraved patterns 120 in the opposite directions to the inward slanting directions of the plurality of unit engraved patterns 120 constituting the third engraved pattern group GP3. In this case, the plurality of unit engraved patterns constituting the first, second and fourth engraved pattern groups GP1, GP2, and GP4 are arranged in one row, respectively. The plurality of unit engraved patterns constituting the third engraved pattern group GP3 are arranged in two rows. Further, the first and second engraved pattern groups GP1 and GP2 are arranged close to each other, and the third and fourth engraved pattern groups GP3 and GP4 are arranged on both sides of the first and second engraved pattern groups GP1 and GP2.

Under the above-mentioned configuration, the first and second engraved pattern groups GP1 and GP2 have high stability with respect to the stress applied in the mesial and distal directions, the third engraved pattern group GP3 more stably copes with the masticatory force, and the fourth engraved pattern group GP4 has a resistant axial direction with respect to a direction of tooth intrusion or eruption so that it can more stably cope with combined stress applied in every direction.

As described above, the orthodontic bracket according to the present invention can effectively cope with stress applied in various directions such as an occlusal direction of antagonist teeth, a tension direction of an orthodontic implant or coil spring, a direction of a rotating force of an arch wire, and so on.

The present invention may be modified in various ways and may have several exemplary embodiments. Terms used in this application are used to only describe specific exemplary embodiments and are not intended to restrict the present invention. Accordingly, it should be understood that the invention covers all the modifications, equivalents, and replacements within the idea and technical scope of the invention. Therefore, the present invention is not to be restricted by the embodiment but only by the appended claims.

What is claimed is:

1. An orthodontic bracket comprising:
a base having a bonding reference surface coming into contact with a tooth and a plurality of unit engraved patterns slanted inward to given depths from the bonding reference surface to allow a bonding agent for bonding the tooth thereto to be accommodated therein; and
a body provided on top of the base and having a slot adapted to insert a wire thereinto,
wherein when groups of the unit engraved patterns formed in the same slanting directions as one another among the plurality of unit engraved patterns are defined as engraved pattern groups, the base has at least two or more engraved pattern groups, while the plurality of unit engraved patterns constituting each engraved pattern group are being spaced apart from one another by a given distance in at least one row, and the engraved pattern groups comprise: a first engraved pattern group having the inward slanting direction of the plurality of unit engraved patterns in a mesial direction of the tooth alignment when the base is attached to the tooth; and a second engraved pattern group having the inward slanting directions of the plurality of unit engraved patterns in a distal direction of the tooth alignment,
wherein the bonding reference surface comprises a plurality of bonding reference surfaces having different curved surfaces from one another in such a manner as to have different curvature radiuses from one another when the base is cut in a tooth arrangement direction,
wherein the plurality of bonding reference surfaces comprise: a first bonding reference surface coming into contact with a facial axis of the clinical crown (FACC) of the tooth when the base is bonded to the tooth and having the smallest section curvature radius when compared with other bonding reference surfaces; and second bonding reference surfaces coming into contact with both ends of the first bonding reference surface, the plurality of bonding reference surfaces satisfying the following conditional expression:

$$0.3 \leq \frac{A_1}{A_{all}} \leq 0.95.$$

2. The orthodontic bracket according to claim 1, wherein each unit engraved pattern has first, second, third and fourth slant surfaces which are inner walls formed in a depth direction thereof, the first slant surface and the second slant surface being spaced apart from each other by a given distance in such a manner as to face each other, the third slant surface being located between one side of the first slant surface and one side of the second slant surface, and the fourth slant surface being located between the other side of the first slant surface and the other side of the second slant surface, while being spaced apart from the third slant surface in such a manner as to face the third slant surface, and when the base is bonded to the tooth, the first slant surface and the second slant surface are arranged in a direction of traction stress of the body through the wire or in an opposite direction to the direction of the traction stress, while being inwardly slanted in the direction of the traction stress or in the opposite direction to the direction of the traction stress, wherein the second slant surface is slant to a given inclination with respect to the first slant surface so that a width between the first slant surface and the second slant surface becomes gradually narrow toward the inside of each unit engraved pattern.

3. The orthodontic bracket according to claim 1, wherein the total number (n) of unit engraved patterns is greater than 10 and less than 40.

4. The orthodontic bracket according to claim 1, wherein the unit engraved patterns constituting the first engraved pattern group and the second engraved pattern group are arranged in at least two rows, respectively, and each row of the unit engraved patterns constituting the first engraved pattern group and each row of the unit engraved patterns constituting the second engraved pattern group are arranged alternately with each other.

5. The orthodontic bracket according to claim 2, wherein the neighboring corners (R1, R2, R3, and R4) of the first to fourth slant surfaces are rounded to a given curvature (r), and linear portions (S3 and S4) formed between the third and fourth slant surfaces and the bonding reference surface are slanted to a given inclination angle (θ) with respect to line segments (S$_O$) perpendicular to linear portions (S1 and S2) formed between the first and second slant surfaces and the bonding reference surface.

6. The orthodontic bracket according to claim 5, wherein the inclination angle (θ) satisfies the following conditional expression: 0°<θ<45°.

7. The orthodontic bracket according to claim 5, wherein the given radius of curvature (r) of the neighboring corners (R1, R2, R3, and R4) of the first to fourth slant surfaces satisfies the following conditional expression: 0.01<r<0.5 [mm].

8. The orthodontic bracket according to claim 5, wherein the fourth slant surface is located in parallel to the third slant surface, and otherwise, the fourth slant surface is slant to a given inclination with respect to the third slant surface so that a width between the third slant surface and the fourth slant surface becomes gradually narrow toward the inside thereof.

9. The orthodontic bracket according to claim 3, wherein the number of unit engraved patterns satisfies the following conditional expression:

$$\frac{\sum_{i=10}^{n} V_i}{n \cdot V_{min}} \leq 1.25,$$

wherein n indicates the total number of unit engraved patterns, Vi indicates the volume of i-th unit engraved pattern, and Vmin indicates the volume of the unit engraved pattern having the smallest volume among the unit engraved patterns.

10. An orthodontic bracket comprising:

a base having a bonding reference surface coming into contact with a tooth and a plurality of unit engraved patterns slanted inward to given depths from the bonding reference surface to allow a bonding agent for bonding the tooth thereto to be accommodated therein; and a body provided on top of the base and having a slot adapted to insert a wire thereinto, wherein when groups of the unit engraved patterns formed in the same slanting directions as one another among the plurality of unit engraved patterns are defined as engraved pattern groups, the base has at least two or more engraved pattern groups, while the plurality of unit engraved patterns constituting each engraved pattern group are being spaced apart from one another by a given distance in at least one row, and the engraved pattern groups comprise: a first engraved pattern group having the inward slanting direction of the plurality of unit engraved patterns in a mesial direction of the tooth alignment when the base is attached to the tooth; a second engraved pattern group having the inward slanting direction of the plurality of unit engraved patterns in a distal direction of the tooth alignment; and a third engraved pattern group having the inward slanting directions of the plurality of unit engraved patterns in a perpendicular direction to the inward slanting directions of the plurality of unit engraved patterns constituting the first and second engraved pattern groups.

11. The orthodontic bracket according to claim 10, wherein the plurality of unit engraved patterns constituting the first and second engraved pattern groups are arranged in total four rows so that a first two rows among the four rows are each comprised of both the first and second engraved pattern groups, and in a remaining two of the four rows, the plurality of unit engraved patterns constituting the first and second engraved pattern groups are arranged in one row, respectively, and the plurality of unit engraved patterns constituting the third engraved pattern group are arranged in two additional rows.

12. The orthodontic bracket according to claim 10, wherein the engraved pattern groups further comprise a fourth engraved pattern group having the inward slanting directions of the plurality of unit engraved patterns in an opposite directions to the inward slanting directions of the plurality of unit engraved patterns constituting the third engraved pattern group.

13. The orthodontic bracket according to claim 12, wherein the plurality of unit engraved patterns constituting the first, second and fourth engraved pattern groups are arranged in one row, respectively, the plurality of unit engraved patterns constituting the third engraved pattern group are arranged in two rows, and while the first and second engraved pattern groups being arranged close to each other, the third and fourth engraved pattern groups are arranged on both sides of the first and second engraved pattern groups.

* * * * *

UNITED STATES PATENT AND TRADEMARK OFFICE
CERTIFICATE OF CORRECTION

| | | |
|---|---|---|
| PATENT NO. | : 11,033,364 B2 | Page 1 of 1 |
| APPLICATION NO. | : 17/094014 | |
| DATED | : June 15, 2021 | |
| INVENTOR(S) | : Sung Hee Yoon | |

It is certified that error appears in the above-identified patent and that said Letters Patent is hereby corrected as shown below:

On the Title Page

Add Item (30) "Foreign Application Priority Data November 11, 2019 (KR) 10-2019-0143394".

Signed and Sealed this
Tenth Day of January, 2023

Katherine Kelly Vidal
*Director of the United States Patent and Trademark Office*